(12) United States Patent
Calabrese

(10) Patent No.: US 7,097,046 B2
(45) Date of Patent: Aug. 29, 2006

(54) AUTOMATICALLY CLEANING FILTER ASSEMBLY FOR A LIQUID-CARRYING LOOP

(76) Inventor: Gerry Calabrese, 15951 SW. 41st St., Suite 600, Fort Lauderdale, FL (US) 33331

(*) Notice: Subject to any disclaimer, the term of this patent is extended or adjusted under 35 U.S.C. 154(b) by 0 days.

(21) Appl. No.: 11/069,001

(22) Filed: Mar. 1, 2005

(65) Prior Publication Data

US 2005/0194326 A1    Sep. 8, 2005

Related U.S. Application Data

(60) Provisional application No. 60/550,148, filed on Mar. 3, 2004.

(51) Int. Cl.
B01D 33/15 (2006.01)
B01D 33/44 (2006.01)
B01D 33/50 (2006.01)

(52) U.S. Cl. .............. 210/391; 210/123; 210/169; 210/392; 210/396; 210/407; 210/416.2; 210/420; 210/424; 210/425; 210/427

(58) Field of Classification Search ............. 210/130, 210/132, 143, 154, 167, 169, 195, 391, 402, 210/406, 407, 416.1, 416.2, 433.1, 434
See application file for complete search history.

(56) References Cited

U.S. PATENT DOCUMENTS

| | | | | |
|---|---|---|---|---|
| 1,264,990 A | * | 5/1918 | Stephens | 210/396 |
| 1,914,742 A | * | 6/1933 | Hillier | 210/784 |
| 1,992,005 A | * | 2/1935 | Goldsborough | 210/158 |
| 2,302,449 A | * | 11/1942 | Laughlin | 210/273 |
| 2,860,785 A | * | 11/1958 | Gardner | 210/195.1 |
| 3,347,379 A | * | 10/1967 | Miller | 210/127 |
| 4,090,965 A | * | 5/1978 | Fuchs | 210/151 |
| 4,152,265 A | * | 5/1979 | Meyers | 210/273 |
| 4,248,709 A | * | 2/1981 | Irving | 210/769 |
| 4,639,315 A | * | 1/1987 | Fuchs et al. | 210/333.1 |
| 4,772,398 A | * | 9/1988 | Sando et al. | 210/703 |
| 4,818,402 A | * | 4/1989 | Steiner et al. | 210/411 |
| 4,867,879 A | * | 9/1989 | Muller | 210/392 |
| 4,898,671 A | * | 2/1990 | Fux et al. | 210/333.01 |
| 5,213,685 A | * | 5/1993 | Padovan | 210/326 |
| 5,268,095 A | * | 12/1993 | Barzuza | 210/143 |
| 5,300,225 A | * | 4/1994 | Fischer | 210/391 |
| 5,362,384 A | * | 11/1994 | Whetsel | 210/85 |
| 5,374,360 A | * | 12/1994 | Weis | 210/780 |
| 5,401,405 A | * | 3/1995 | McDougald | 210/273 |
| 5,433,843 A | * | 7/1995 | Calabrese | 210/138 |
| 5,558,042 A | * | 9/1996 | Bradley et al. | 119/226 |
| 5,641,398 A | * | 6/1997 | Huber et al. | 210/158 |

(Continued)

Primary Examiner—Robert James Popovics
(74) Attorney, Agent, or Firm—Laurence A. Greenberg; Werner H. Stemer; Ralph E. Locher

(57) ABSTRACT

A filter assembly for an aquarium has a self-cleaning filter. A fine mesh filter screen is disposed between an inlet and an outlet for filtering solid matter from the water that is pumped from the aquarium, through the filter, and back to the aquarium. When the filter screen is sufficiently loaded, or according to a set schedule, the solid matter is suctioned off the filter screen with a vacuum assembly. For that purpose, the water flow is first diverted, the filter screen is rotated, and the vacuum assembly is turned on. After the screen has been vacuumed, the vacuum assembly is once more turned off and the water flow is redirected to pass through the filter screen.

4 Claims, 3 Drawing Sheets

U.S. PATENT DOCUMENTS

| | | | |
|---|---|---|---|
| 5,779,887 A * | 7/1998 | Rector et al. | 210/159 |
| 5,876,612 A * | 3/1999 | Astrom | 210/741 |
| 6,090,298 A * | 7/2000 | Weis | 210/780 |
| 6,572,763 B1 * | 6/2003 | Gorshing | 210/159 |
| 6,808,076 B1 * | 10/2004 | Villares Lenz Cesar | 210/391 |
| 2004/0112806 A1 * | 6/2004 | Anderson | 210/106 |
| 2004/0124158 A1 * | 7/2004 | Smith et al. | 210/791 |
| 2005/0194326 A1 * | 9/2005 | Calabrese | 210/798 |
| 2005/0230293 A1 * | 10/2005 | Anderson | 210/106 |

* cited by examiner

AUTOMATICALLY CLEANING FILTER ASSEMBLY FOR A LIQUID-CARRYING LOOP

CROSS-REFERENCE TO RELATED APPLICATION

This application claims the benefit, under 35 U.S.C. § 119(e), of provisional application No. 60/550,148, filed Mar. 3, 2004. The entire disclosure of the prior application is herewith incorporated by reference.

BACKGROUND OF THE INVENTION

Field of the Invention

The invention relates to a filter assembly for closed loop cleaning systems in circuits carrying water or other liquid media. Specifically, the invention relates to an automatically cleaning filter in a water loop of an aquarium, a swimming pool, or any other such system.

In order to assure a clean environment in stationary bodies of water such as aquariums, bio-ponds, and pools, it is typically necessary to clean the water to remove organic matter and accelerators for algae growth. In aquariums, for instance, and particularly in saltwater aquariums, continuous cleaning and filtering of the water is essential.

Cleaning and filtering is effected by pumping the water from the tank through a loop with a filter assembly and from there back into the tank. Typically, the water is pumped at an amount to assure that the complete body of water is recycled once every hour or half hour, depending on the amount of cleaning required and the desired purity of the water.

Such filter assemblies require cleaning when the filter element becomes occupied by the solid matter that is being filtered out of the water. In aquariums, such solid matter accumulates very quickly when the fish are fed, because much of the food and related feedstuff waste materials are pumped through the filter loop before they can be processed by the fish. Also, the organic matter is first collected by the filter element and, upon further pumping, it is broken down into particles small enough to penetrate the filter element. These organic matter particles are now pumped back into the aquarium and, because of their very small size, they are no longer useful as food for the fish, they are very useful for starting and feeding undesirable algae growth. Even more damaging is the fact that the organic matter remains on and in the filter and generates, as a byproduct, ammonia, which is detrimental to fish and other life forms in the aquarium.

SUMMARY OF THE INVENTION

It is accordingly an object of the invention to provide a filter assembly, which overcomes the above-mentioned disadvantages of the heretofore-known devices and methods of this general type and which provides for a pump and filter assembly with an automatic cleaning cycle.

With the foregoing and other objects in view there is provided, in accordance with the invention, a filter assembly for a water loop, comprising:
a housing formed with an inlet and an outlet;
a filter screen disposed between the inlet and the outlet and configured to filter solid matter from water passing therethrough; and
a vacuum assembly for selectively vacuuming the solid matter from the filter screen.

In accordance with an added feature of the invention, the filter screen is rotatably supported in the housing, and a motor is connected to the filter screen for rotating the filter screen past a suction head of the vacuum assembly.

In accordance with an additional feature of the invention, the filter screen is a fine mesh sieve having a mesh size of no more than 500 microns, and preferably approximately 100 microns.

In accordance with another feature of the invention, there is provided a bypass for bypassing the filter screen between the inlet and the outlet and for stopping a water flow through the screen while the vacuum assembly vacuums the solid matter from the filter screen.

With the above and other objects in view there is also provided, in accordance with the invention, a filter assembly for an aquarium, comprising:
a filter housing having an inlet connected to receive water from the aquarium and an outlet connected to return the water to the aquarium;
a filter assembly disposed in the housing, the filter assembly including a rotatably supported fine mesh screen for filtering solid matter from the water and trapping the solid matter; and
a vacuum assembly having a vacuum head disposed to vacuum the solid matter from the fine mesh screen while the screen is rotated past the vacuum head.

In accordance with a further feature of the invention, a motor is connected to the screen for rotating the screen past the vacuum head. In a preferred embodiment, a bypass valve is connected to temporarily divert a water flow between the inlet and the outlet and to bypass the filter screen while the screen is rotated and vacuumed by the vacuum assembly.

Preferably, the novel filter assembly is a completely automatic system. For that purpose, a control unit is connected to the motor, to the vacuum assembly, and to the bypass valve. The control unit selectively turns the bypass valve to a bypass position, turns on the motor for rotating the filter screen, and causes the vacuum assembly to vacuum the solid matter from the screen. Upon finishing the vacuuming operation, the control unit turns off the motor and turns the bypass valve to a normal position in which the water flows from the inlet through the filter screen and to the outlet.

With the above and other objects in view there is also provided, in accordance with the invention, a method of cleaning a filter assembly connected in a water loop, which comprises:
pumping water through the filter assembly for filtering the water and trapping solid matter in a filter screen of the filter assembly;
monitoring the filter assembly with regard to a loading of the filter screen and, if a given amount of solid matter has been trapped by the filter screen,
bypassing the filter screen;
vacuuming the solid matter from the filter screen; and
returning the filter assembly to normal operation in which the water is pumped through the filter screen.

In accordance with an additional mode of the method, the bypassing, vacuuming, and returning steps are triggered sporadically by schedule even if the given amount of solid matter has not been trapped by the filter screen.

In accordance with a concomitant feature of the invention, the monitoring step comprises monitoring a water level inside a filter assembly tank and, if the water level reaches a given level, determining that the filter screen is sufficiently loaded and the bypassing and vacuuming steps should be triggered.

By removing the solid matter, i.e., the organic matter, from the filter screen, the formation of the byproduct ammonia is avoided or maintained at a minimum.

Other features which are considered as characteristic for the invention are set forth in the appended claims.

Although the invention is illustrated and described herein as embodied in an automatically cleaning filter assembly for a liquid-carrying loop, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
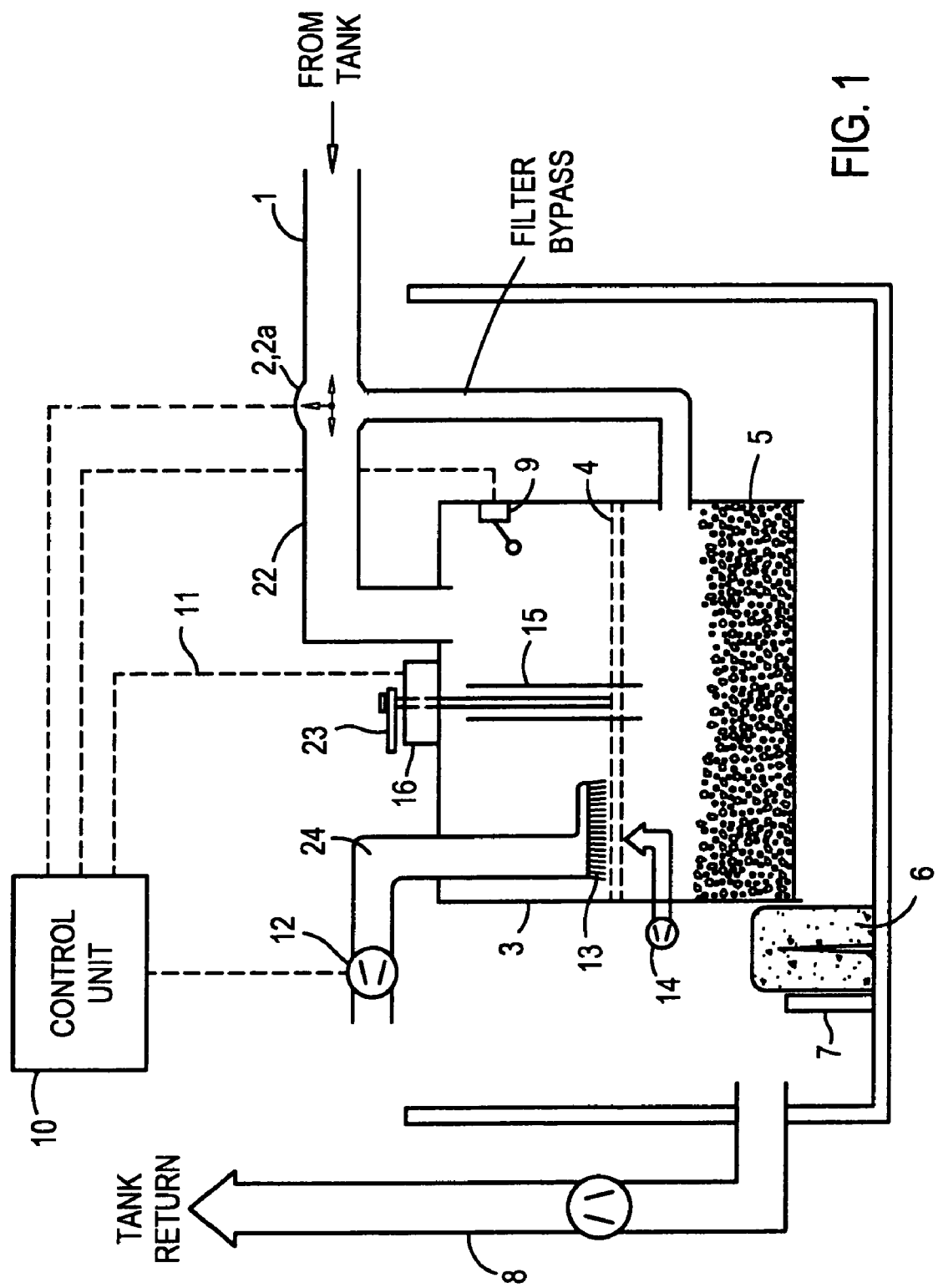
FIG. 1 is a simplified diagram of a filter assembly according to the invention.

Referring now to the figures of the drawing in detail and first, particularly, to FIG. 1 thereof, there is seen a diagram of the novel filter assembly. The structure of the assembly is best understood with reference to the following description of the functionality of the novel filter assembly. Water from an aquarium or the like is pumped via an inlet pipe 1, through a valve 2, into a filter housing 3. There, the water falls through a fine mesh filter 4. Mesh material is widely available in standard sizes and sieve openings. See, for example, http://www.wovenwire.com/reference/particle-size-print.htm. The mesh of the filter 4 catches all solid matter with a size the exceeds the rated mesh size. The solid matter is primarily composed of organic matter from the aquarium, such as food and discharges. The water then proceeds through a bed of bioballs 5, wherein bacteria aid in processing the materials in a nitrogen cycle. Pumps and materials of this type are available, for example, from Aquatic Eco-Systems, Inc., Apopka, Fla. Additional information concerning the functionality of the biofilter is found in my earlier U.S. Pat. No. 5,433,843, which is herewith incorporated by reference. Here, the combination of the fine mesh filter 4 (organic, mineral matter, and microbes>100 microns) with the biofilter 5 is particularly suitable and provides for a hysteresis effect that cleans the aquarium water particularly well. From there, the water is forced through a foam filter 6 so as to catch the air bubbles and the flow is deflected past a barrier wall 7 and into a return line 8. I have also found that, surprisingly, fine mesh of, say, 100 micron mesh size catches and traps living organisms such as parasites that are larger than 100 microns.

The valve 2 is a three-way valve, with one in (from the aquarium) and two outlets. The first outlet position leads to the filter housing 3. The second outlet position bypasses the filter housing 3. When the filer mesh becomes clogged to such an extent that the water flow from the aquarium exceeds the permeability of the mesh filter 4, the water level above the filter 4 rises until a float switch 9 is closed. The closing of the float switch 9 indicates that the filter 4 requires cleaning.

The cleaning sequence is as follows: The float switch 9 provides a signal to a control unit 10. Upon receiving the signal—which indicates that the mesh is plugged up—the control unit 10 first drives the valve 2 to its second position at which the water flow from the aquarium is diverted so as to bypass the filter housing 3. Once the water flow to the filter 4 has ceased, the control unit 10 starts with the cleaning cycle. For that purpose, the filter 4 is slowly rotated about its vertical axis by energizing a motor 16 via the line 11. At the same time, a wet/dry vacuum pump 12 is turned on so as to vacuum the solid matter off the filter screen 4. A brush 13 may be provided at the vacuum head. In addition, it is also possible to blow a water jet, or even an air jet, from underneath at the filter screen 4. A pump for that purpose is indicated at 14. This aids the cleaning intensity and additional particles may be loosened from the filter that would otherwise not be suctioned off.

A standpipe 15 or a similar overflow device is provided for the purpose of assuring that the water will still continue to flow in the water loop even if the electronic system happens to malfunction.

Figure 2:
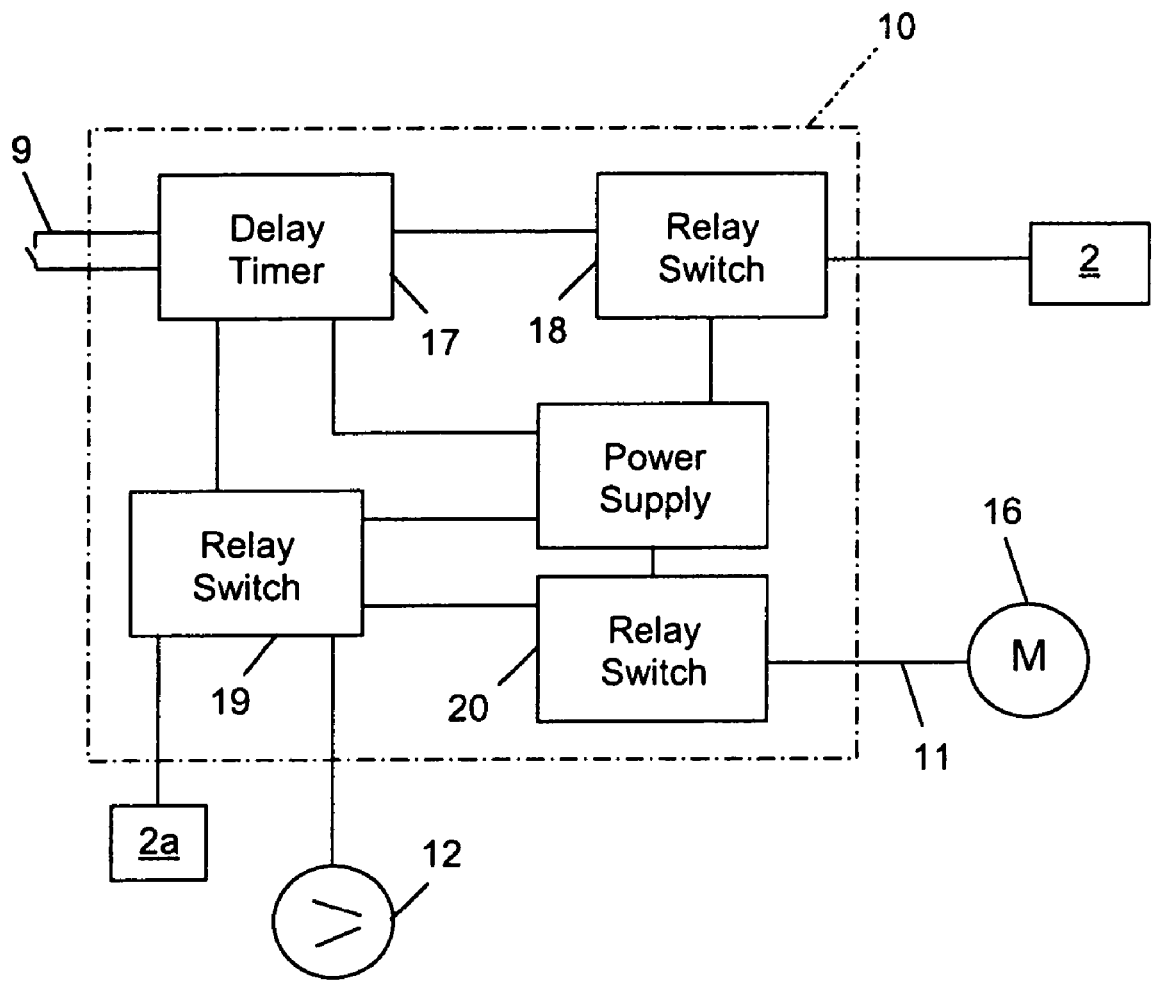
FIG. 2 is a circuit diagram illustrating a preferred embodiment of a control circuit for the filter assembly according to the invention.

The electrical diagram of FIG. 2 illustrates an exemplary implementation of the electronics underlying the device. A variety of delay and relay switches are provided for assuring that the logic sequence of the pumping and cleaning function of the assembly is properly executed. It will be understood that the various portions of the control unit 10 may also be commonly integrated on a single ASIC or on any of a variety of circuit devices. A delay timer 17 is connected to the float switch 9 and it will thus trigger the automatic cleaning when a water level in the housing 3 has reached a fill level that indicates that the filter element 4 is plugged up. A relay switch 18 causes the valve 2 to divert the water flow from the tank to bypass the filter. Once the valve 2 has been switched over, a switch 2a indicates to a relay switch 19 that the system is ready for the cleaning operation. The relay switch 19 turns on the pump 12 and also causes a further relay switch 20 to rotate the screen 4 by powering the motor 16.

The various switches are powered from a common power supply 21. In a preferred embodiment, the power supply 21 receives a mains a.c. voltage of 120 V and triggers the various relays with a 24 VAC. In the same preferred embodiment, the delay timer 17 is a solid state off delay timer 6A859, the relay switch 18 is a 120 V Omron G2R-1-S, and the relay 19 is a 24 VAC relay Omron MK1EP-UA-AC24. Finally, the relay 20 drives the motor 16 with 24 VAC.

Figures 3A, 3B:
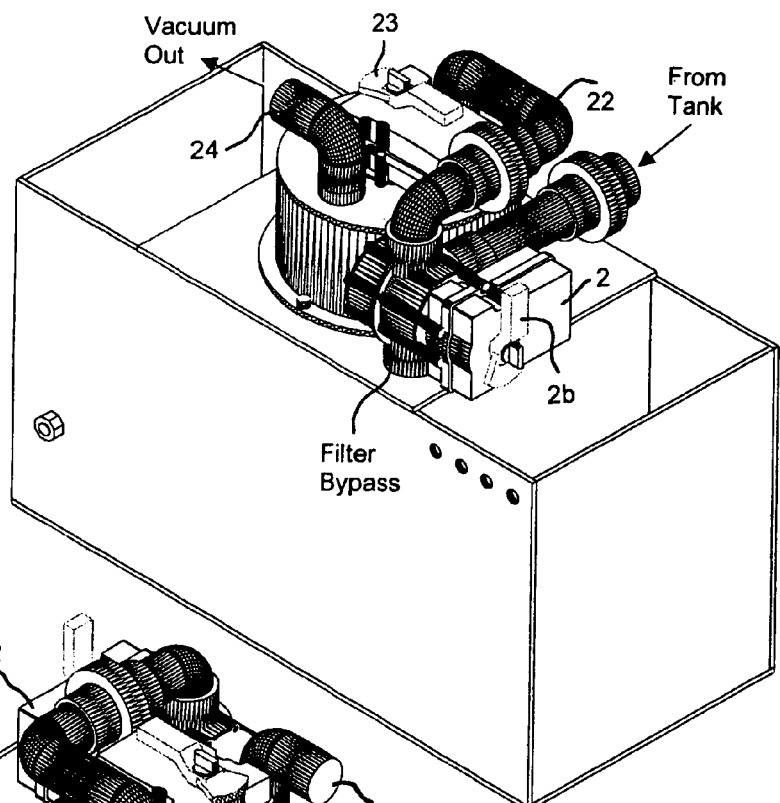
FIG. 3A is a front, top perspective view
FIG. 3B is a rear, top perspective view of an exemplary embodiment of the filter assembly according to the invention.

Referring now to FIG. 3, the pump and filter assembly may be implemented in a compact system with standard plumbing connectors. A suitable system utilizes 1½ inch PVC piping. The filter housing is a rectangular box formed of Lucite or a similar transparent material. The motorized valve 2, which is provided with bypass handle 2b, directs the incoming water flow from the tank either upwardly and into the filter along a conduit 22 and down to the screen 4, or downwardly to bypass the screen 4. While the screen 4 is motorized, i.e., it is rotated by the motor 16, it can also be manually rotated via a handle 23. The handle is connected to a central shaft of the motor 16. The vacuum pump 12 is connected through a conduit 24.

I claim:

1. A filter assembly for an aquarium, comprising:
   a filter housing having an inlet connected to receive water from the aquarium and an outlet connected to return the water to the aquarium;
   a filter assembly disposed in said housing, said filter assembly including a rotatably supported fine mesh screen for filtering solid matter from the water and trapping the solid matter;
   a vacuum assembly having a vacuum head disposed to vacuum the solid matter from said fine mesh screen while said screen is rotated past said vacuum head;
   a bypass valve connected to temporarily divert a water flow between said inlet and said outlet and to bypass said filter screen while said screen vacuumed by said vacuum assembly; and
   a control unit connected to said vacuum assembly and to said bypass valve, said control unit selectively turning said bypass valve to a bypass position, causing said vacuum assembly to vacuum the solid matter from said screen, and, upon finishing the vacuuming operation, turning said bypass valve to a normal position in which the water flows from said inlet through said filter screen and to said outlet.

2. The filter assembly according to claim 1, which further comprises a biofilter disposed downstream of said filter screen in a flow direction of the water.

3. The filter assembly according to claim 1, which comprises a motor connected to said screen for rotating said screen past said vacuum head.

4. The filter assembly according to claim 3, wherein said control unit is configured to selectively turn said bypass valve to a bypass position, turn on said motor for rotating said filter screen, and cause said vacuum assembly to vacuum the solid matter from said screen, and, upon finishing the vacuuming operation, to turn off said motor and to turn said bypass valve to the normal position in which the water flows from said inlet through said filter screen and to said outlet.

* * * * *